(12) United States Patent
You et al.

(10) Patent No.: US 12,499,809 B2
(45) Date of Patent: Dec. 16, 2025

(54) DRIVING DEVICE FOR CONTROLLING PIXEL ARRAY

(71) Applicant: AUO Corporation, Hsinchu (TW)

(72) Inventors: Ji-Yun You, Hsinchu (TW); Chun-Yu Chen, Hsinchu (TW); Yung-Chih Chen, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/965,572

(22) Filed: Dec. 2, 2024

(65) Prior Publication Data

US 2025/0329285 A1    Oct. 23, 2025

(30) Foreign Application Priority Data

Jun. 17, 2024 (TW) ................................. 113122327

(51) Int. Cl.
*G09G 3/32* (2016.01)
*G09G 3/20* (2006.01)

(52) U.S. Cl.
CPC ... *G09G 3/2092* (2013.01); *G09G 2310/0267* (2013.01); *G09G 2310/0286* (2013.01); *G09G 2320/064* (2013.01)

(58) Field of Classification Search
CPC ......... G09G 3/2092; G09G 2310/0267; G09G 2310/0286; G09G 2320/064
See application file for complete search history.

(56) References Cited

U.S. PATENT DOCUMENTS

| 2021/0210002 | A1* | 7/2021 | Kim | G09G 3/32 |
| 2022/0223085 | A1* | 7/2022 | Chang | G09G 3/20 |
| 2022/0246088 | A1* | 8/2022 | Zhai | G09G 3/32 |
| 2023/0024912 | A1* | 1/2023 | Kim | G09G 3/32 |
| 2023/0104084 | A1* | 4/2023 | Yang | G09G 3/32 345/691 |
| 2023/0154372 | A1* | 5/2023 | Hwang | G09G 3/2011 345/691 |
| 2023/0154394 | A1* | 5/2023 | Kim | G09G 3/2014 345/691 |
| 2023/0178012 | A1* | 6/2023 | Kim | G09G 3/2014 345/55 |

(Continued)

FOREIGN PATENT DOCUMENTS

| CN | 112927651 A | 6/2021 |
| CN | 114783353 A | 7/2022 |
| TW | I854572 B | 9/2024 |

*Primary Examiner* — Jose R Soto Lopez
(74) *Attorney, Agent, or Firm* — Tim Tingkang Xia, Esq.; Troutman Pepper Locke LLP

(57) ABSTRACT

A driving device is used to control pixels of a pixel array. The driving device includes driving circuits. Each driving circuit includes a pulse width modulation circuit, which is used to provide an output pulse signal to at least one of the pixels of the pixel array, and a shift control circuit, which is used to provide a shift pulse signal to the pulse width modulation circuit and the shift control circuit of a next stage. The output pulse signal has an output pulse width. The shift pulse signal has a shift pulse width, which is substantially equal to a first period of a first clock signal or a second period of a second clock signal. The first period is equal to the second period. The pulse width modulation circuit modulates the output pulse width in response to the shift pulse signal, a data signal and a sweep signal.

16 Claims, 13 Drawing Sheets

(56) References Cited

U.S. PATENT DOCUMENTS

| | | | |
|---|---|---|---|
| 2023/0238398 A1* | 7/2023 | Choi | H10D 86/60 |
| 2024/0005836 A1* | 1/2024 | Zhai | G09G 3/2014 |
| 2024/0203323 A1* | 6/2024 | Woo | G09G 3/32 |
| 2024/0257723 A1* | 8/2024 | Kim | G09G 3/3233 |
| 2025/0078730 A1* | 3/2025 | Lee | G09G 3/34 |
| 2025/0095574 A1* | 3/2025 | Kim | G09G 3/2014 |
| 2025/0218343 A1* | 7/2025 | Zhang | G09G 3/3266 |

* cited by examiner

DRIVING DEVICE FOR CONTROLLING PIXEL ARRAY

CROSS-REFERENCE TO RELATED PATENT APPLICATION

This non-provisional application claims priority to and the benefit of, pursuant to U.S.C. § 119(a), patent application No. 113122327 filed in Taiwan on Jun. 17, 2024. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to an electronic device, and in particular to an driving device for controlling a pixel array.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the advancement of display technology, various sizes of flat panel displays have been developed. Typically, in a flat-panel display, a gate driver on array (GOA) device is used to drive the pixels in the pixel array of the flat-panel display. More specifically, the GOA device provides output signals to the pixel array, and controls the transistor switches in the pixel array by the output signals, thus adjusting the conduction time of the transistor switches, and thereby controlling the emission duration and/or brightness of the pixels.

However, the operation of the existing GOA circuit is limited by the clock signals, where the width of the output signal is fixed and cannot be modulated (e.g., the width of the output signal is fixed to an integer multiple of the period of the clock signal). Moreover, the waveform of the output signal may need to fully align with the waveform of the clock signal. Since the waveform and width of the output signal of the existing GOA circuit cannot be adjusted, flexibility in adjusting the emission duration and/or brightness of the pixels is lost.

To address the above issues, there is a need for an improved driving device capable of modulating the waveform and width of the output signal.

SUMMARY

According to one embodiment of the present disclosure, a driving device is used to control a plurality of pixels of a pixel array. The driving device includes a plurality of driving circuits, and the driving circuits include a current stage driving circuit and a next stage driving circuit. Each of the driving circuits includes a pulse width modulation circuit and a shift control circuit. The pulse width modulation circuit is used to provide an output pulse signal to at least one of the pixels of the pixel array, and the output pulse signal has an output pulse width. The shift control circuit is used to provide a shift pulse signal to the pulse width modulation circuit and the shift control circuit of the next stage driving circuit, where the shift pulse signal has a shift pulse width, and the shift pulse width is substantially equal to a first period of a first clock signal or a second period of a second clock signal. The first period is equal to the second period, and the pulse width modulation circuit modulates the output pulse width in response to the shift pulse signal, a data signal and a sweep signal.

These and other aspects of the present disclosure will become apparent from the following description of the embodiment taken in conjunction with the following drawings, detailed description and the claims, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

The technical terms in the specification are based on the conventional terminology of the relevant technical field. Where certain terms are explained or defined in the specification, their interpretation shall follow the explanations or definitions provided herein. Each embodiment of the present disclosure includes one or more technical features. Where feasible, those skilled in the art may selectively implement some or all of the technical features of any given embodiment or selectively combine some or all of the technical features across these embodiments.

Figure 1:
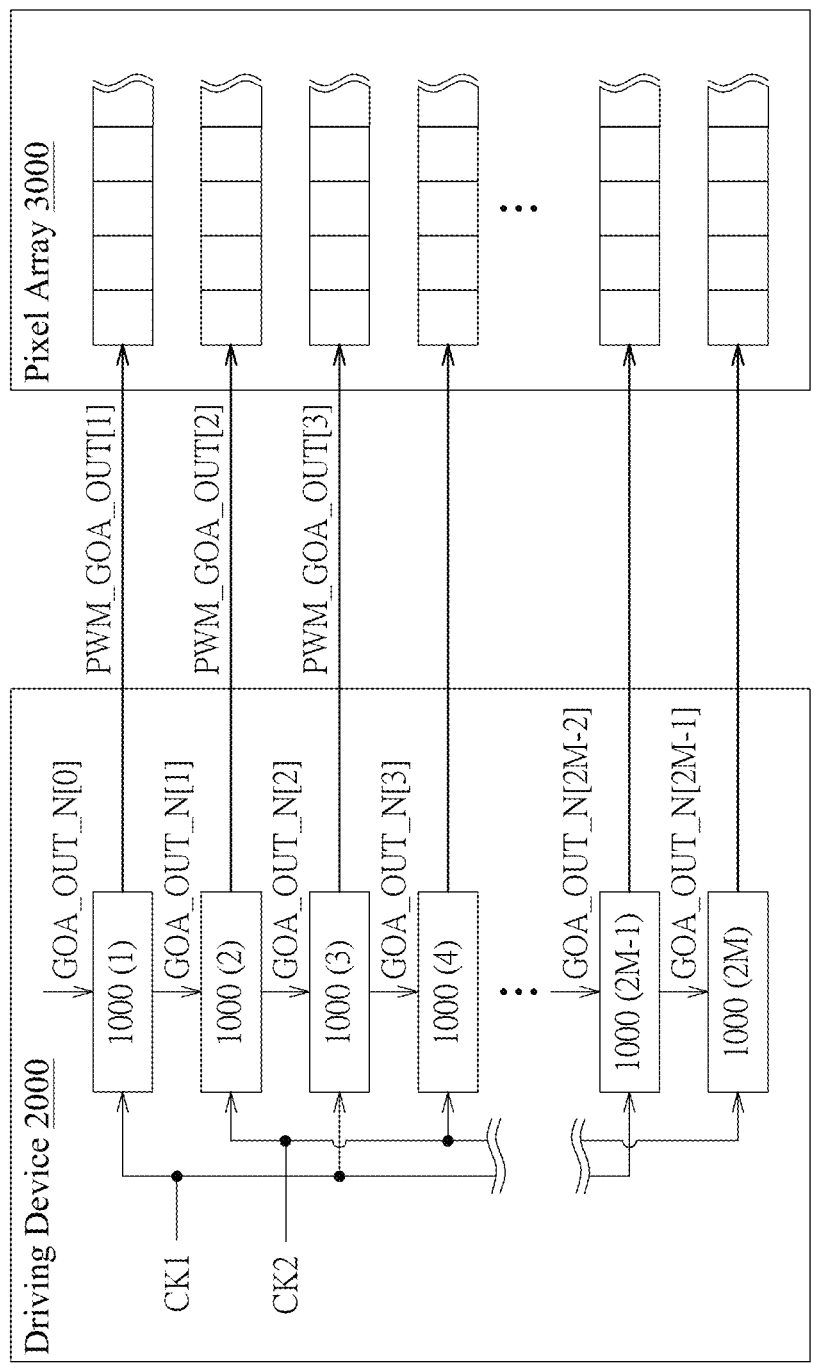
FIG. 1 is a functional block diagram of a driving device according to one embodiment of the present disclosure.

FIG. 1 is a functional block diagram of a driving device 2000 according to one embodiment of the present disclosure. The driving device 2000 is, for example, a gate driver on array (GOA) device, and the driving device 2000 is used to control a plurality of pixels in a pixel array 3000. For example, the driving device 2000 is used to control the switching of thin-film transistors (TFTs) in each pixel.

The driving device 2000 includes multiple stages of driving circuits 1000(1), 1000(2), 1000(3), 1000(4), ..., 1000(2M−1), and 1000(2M). Each of the driving circuits 1000(1) to 1000(2M) provides driving signals to the corresponding pixels in the pixel array 3000. For example, the driving circuit 1000(1) provides an output pulse signal PWM_GOA_OUT[1], the driving circuit 1000(2) provides an output pulse signal PWM_GOA_OUT[2], the driving circuit 1000(3) provides an output pulse signal PWM_GOA_OUT[3], and so on. Further, each of the driving circuits 1000(1) to 1000(2M) also provides driving signals to the driving circuit of a subsequent stage (i.e., a next stage driving circuit). For example, the first stage driving circuit 1000(1) provides a shifting signal GOA_OUT_N[1] to the second stage driving circuit 1000(2), the second stage driving circuit 1000(2) provides a shifting signal GOA_OUT_N[2] to the third stage driving circuit 1000(3), and so on. In addition, the first stage driving circuit 1000(1) may receive an initial shifting signal GOA_OUT_N[0] from another circuit unit (not shown in the figure).

Among the driving circuits 1000(1) to 1000(2M), the driving circuits 1000(1), 1000(3), ..., 1000(2M−1) are odd stage driving circuits, which operate based on a first clock signal CK1. On the other hand, the driving circuits 1000(2), 1000(4), ..., 1000(2M) are even stage driving circuits, which operate based on a second clock signal CK2.

Figure 2:
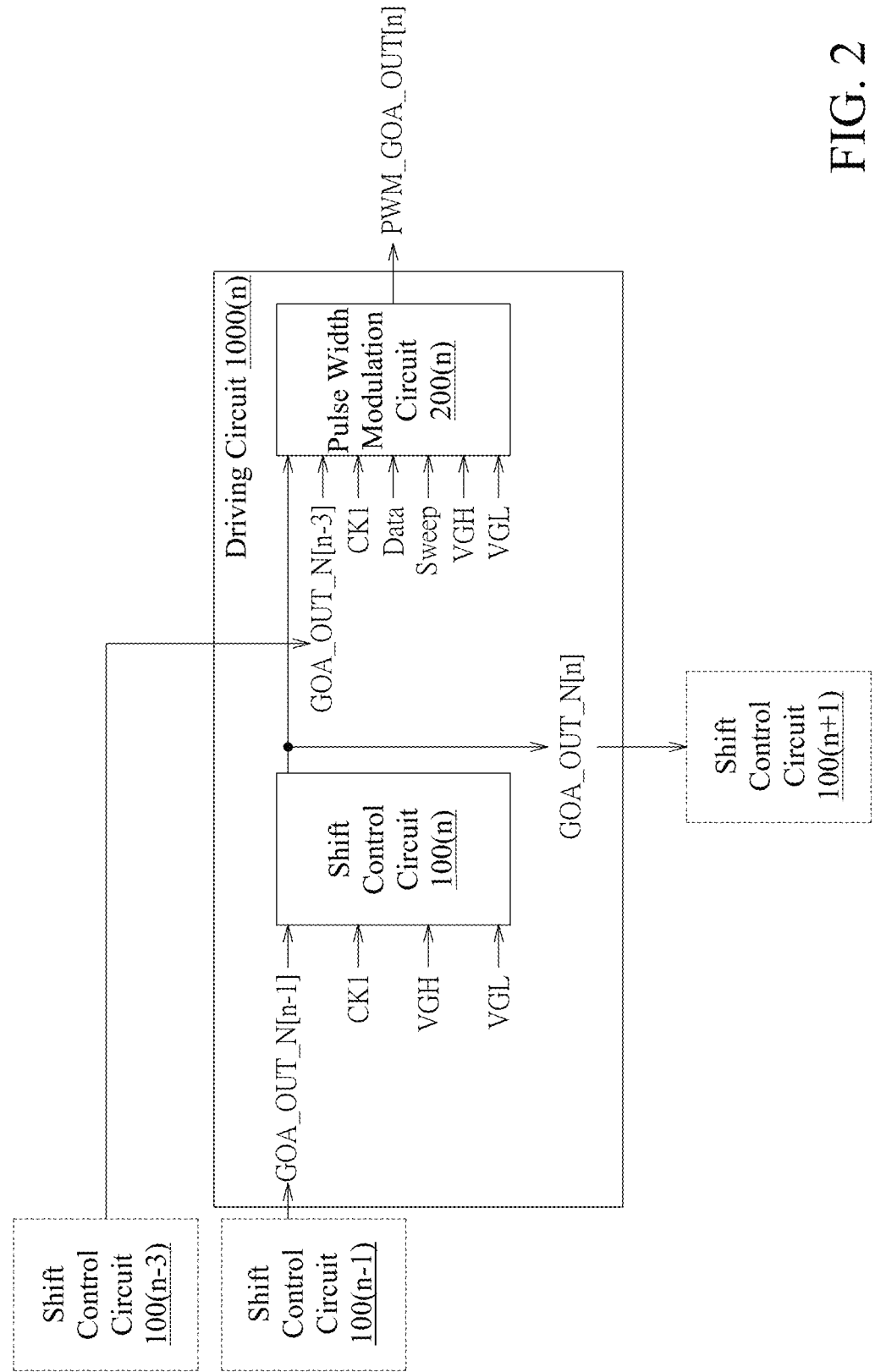
FIG. 2 is a functional block diagram of one of the driving circuits of the driving device in FIG. 1.

FIG. 2 is a functional block diagram of a driving circuit 1000(n) of the driving device 2000 in FIG. 1. As shown in FIG. 2, the driving circuit 1000(n) is referred to as the current stage driving circuit, where the parameter "[n]" denotes the "current stage" (i.e., the n-th stage). The driving circuit 1000(n) includes a shift control circuit 100(n) and a pulse width modulation circuit 200(n).

The shift control circuit 100(n) operates with reference to a gate high voltage VGH and a gate low voltage VGL. The gate high voltage VGH is, for example, substantially equal to 6V, and the gate low voltage VGL is, for example, substantially equal to −6V. The shift control circuit 100(n) receives the first clock signal CK1 and the shift pulse signal GOA_OUT_N[n−1] of a previous stage, and shifts the shift pulse signal GOA_OUT_N[n−1] of the previous stage to generate the shift pulse signal GOA_OUT_N[n] of the current stage. More specifically, the shift pulse signal GOA_OUT_N[n−1] of the previous stage is from the shift control circuit 100(n−1) of a previous stage driving circuit 1000(n−1) of the driving device 2000, where the parameter "[n−1]" denotes the "previous stage" (i.e., the (n−1)-th stage). The shift control circuit 100(n) uses one half of the period P1 of the first clock signal CK1 as a shifting amount to perform shifting to the shift pulse signal GOA_OUT_N[n−1] of the previous stage to form the shift pulse signal GOA_OUT_N[n] of the current stage. Further, the shift pulse signal GOA_OUT_N[n] of the current stage is provided to the pulse width modulation circuit 200(n) of the current stage and the shift control circuit 100(n+1) of the next stage.

The shift pulse signal GOA_OUT_N[n] has a shift pulse width W1, and the shift pulse width W1 is substantially equal to the period P1 of the first clock signal CK1 and the period P2 of the second clock signal CK2 (FIG. 2 does not show the second clock signal CK2; the period P2 of the second clock signal CK2 is substantially equal to the period P1 of the first clock signal CK1). The period P1 is referred to as the first period, and the period P2 is referred to as the second period.

On the other hand, the pulse width modulation circuit 200(n) also operates with reference to the gate high voltage VGH and the gate low voltage VGL. The pulse width modulation circuit 200(n) receives the shift pulse signal GOA_OUT_N[n] of the current stage from the shift control circuit 100(n) of the current stage, and receives a shift pulse signal GOA_OUT_N[n−3] of a previous third stage, where the parameter "[n−3]" denotes the "previous third stage" (i.e., the (n−3)-th stage). Moreover, the pulse width modulation circuit 200(n) receives the first clock signal CK1, a data signal Data and a sweep signal Sweep. The shift pulse signals GOA_OUT_N[n−3], GOA_OUT_N[n−1] and GOA_OUT_N[n] of each stage have the same shift pulse width W1.

The pulse-width modulation circuit 200(n) generates an output pulse signal PWM_GOA_OUT[n] of the current stage. The output pulse signal PWM_GOA_OUT[n] has an output pulse width W2, and the output pulse width W2 may be modulated. More specifically, the pulse width modulation circuit 200(n) modulates the output pulse width W2 with reference to the rising edge or the falling edge of the first clock signal CK1 and the second clock signal CK2, and in response to the shift pulse signal GOA_OUT_N[n] of the current stage, the shift pulse signal GOA_OUT_N[n−3] of the previous third stage, the data signal Data, and the sweep signal Sweep.

Figure 3:
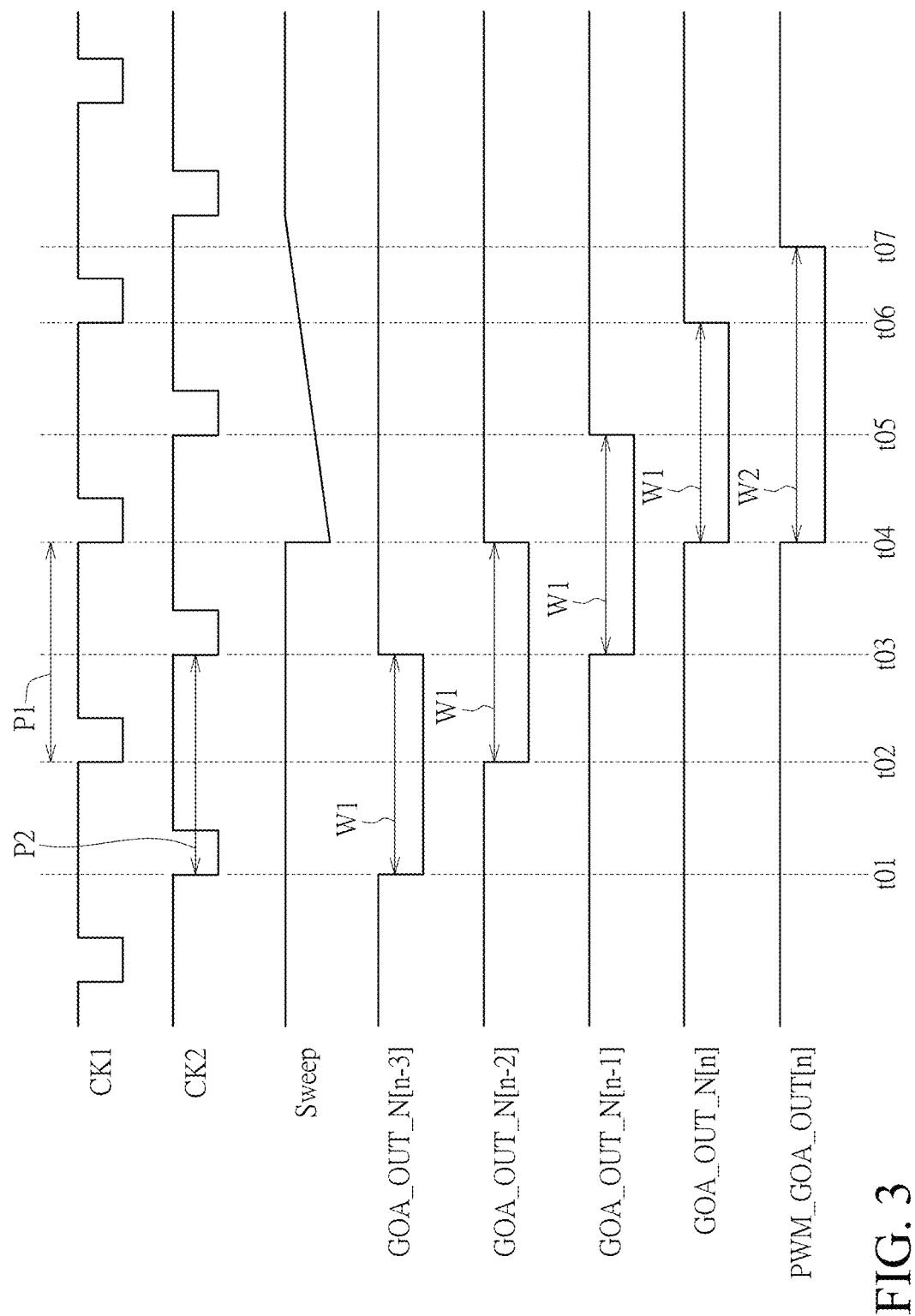
FIG. 3 is a waveform diagram illustrating voltage changes of the signals of the shift control circuit and the pulse width modulation circuit of FIG. 2.

FIG. 3 is a waveform diagram illustrating voltage changes of the signals of the shift control circuit 100(n) and the pulse width modulation circuit 200(n) of FIG. 2. The embodiment of shifting of the shift pulse signal GOA_OUT_N[n] is described with reference to FIG. 3. The shift control circuit 100(n−3) of the previous third stage generates the shift pulse signal GOA_OUT_N[n−3]. The falling edge of the shift pulse signal GOA_OUT_N[n−3] is substantially aligned to the falling edge of the second clock signal CK2 at a timing point t01. The rising edge of the shift pulse signal GOA_OUT_N[n−3] is substantially aligned to the falling edge of the next second clock signal CK2 at a timing point t03. The shift pulse width W1 of the shift pulse signal GOA_OUT_N[n−3] is a timing difference between the falling edge and the rising edge of the shift pulse signal GOA_OUT_N[n−3]. The shift pulse width W1 is substantially equal to the period P2 of the second clock signal CK2 and the period P1 of the first clock signal CK1. The shift pulse signal GOA_OUT_N[n−3] is transmitted to the shift control circuit 100(n−2) of the previous second stage. In the driving device 2000, the falling edge and the rising edge of the shift pulse signal GOA_OUT_N[n] provided by the shift control circuit of each odd stage driving circuit are substantially aligned to two consecutive falling edges of the first clock signal CK1 (for example, the falling edge and the rising edge of the shift pulse signal GOA_OUT_N[1] provided by the shift control circuit 100(1) of the odd stage driving circuit 1000(1) are substantially aligned to two consecutive falling edges of the first clock signal CK1).

Similarly, in the driving device 200, the falling edge and the rising edge of the shift pulse signal GOA_OUT_N[n] provided by the shift control circuit of each even stage driving circuit are substantially aligned to two consecutive falling edges of the second clock signal CK2 (for example, the falling edge and the rising edge of the shift pulse signal GOA_OUT_N[2] provided by the shift control circuit 100 (2) of the even stage driving circuit 1000(2) are substantially aligned to two consecutive falling edges of the second clock signal CK2).

The shift control circuit 100(n-2) of the previous second stage performs shifting to the shift pulse signal GOA_OUT_N[n-3] (with one half of the period P1 of the first clock signal CK1 or the period P2 of the second clock signal CK2 as the shifting amount) to generate the shift pulse signal GOA_OUT_N[n-2]. The falling edge of the shift pulse signal GOA_OUT_N[n-2] is substantially aligned to the falling edge of the first clock signal CK1 at a timing point t02, and the rising edge of the shift pulse signal GOA_OUT_N[n-2] is substantially aligned to the falling edge of the next first clock signal CK1. The shift pulse width W1 of the shift pulse signal GOA_OUT_N[n-2] is equal to that of the shift pulse signal GOA_OUT_N[n-3].

In the same manner, the shift control circuit 100(n-1) of the previous stage receives the shift pulse signal GOA_OUT_N[n-2] and performs shifting to generate the shift pulse signal GOA_OUT_N[n-1]. The falling edge of the shift pulse signal GOA_OUT_N[n-1] is substantially aligned to the falling edge of the second clock signal CK2 at the timing point t03, and the rising edge of the shift pulse signal GOA_OUT_N[n-1] is substantially aligned to the falling edge of the next second clock signal CK2 at the timing point t05. Similarly, the shift control circuit 100(n) of the current stage receives the shift pulse signal GOA_OUT_N[n-1] and performs shifting to generate the shift pulse signal GOA_OUT_N[n]. The falling edge of the shift pulse signal GOA_OUT_N[n] is substantially aligned to the falling edge of the first clock signal CK1 at the timing point t04, and the rising edge of the shift pulse signal GOA_OUT_N[n-1] is substantially aligned to the falling edge of the next first clock signal CK1 at the timing point t06.

On the other hand, the embodiment of modulation of the output pulse width W2 of the output pulse signal PWM_GOA_OUT[n] is described with reference to FIG. 3. At the timing point t04, the voltage of the shift pulse signal GOA_OUT_N[n] changes from the gate high voltage VGH to the gate low voltage VGL to form a falling edge. In response to the falling edge of the shift pulse signal GOA_OUT_N[n], the voltage of the sweep signal Sweep also changes from the gate high voltage VGH to the gate low voltage VGL to form a falling edge. The falling edge of the sweep signal Sweep and the falling edge of the shift pulse signal GOA_OUT_N[n] are substantially aligned to the falling edge of the first clock signal CK1.

Further, in response to the falling edge of the sweep signal Sweep and the falling edge of the shift pulse signal GOA_OUT_N[n], the pulse width modulation circuit 200(n) controls the output pulse signal PWM_GOA_OUT[n] to generate a voltage change, such that the output pulse signal PWM_GOA_OUT[n] changes from the gate high voltage VGH to the gate low voltage VGL to form a falling edge at the timing point t04. In other words, the falling edge of the output pulse signal PWM_GOA_OUT[n] is substantially aligned to the falling edges of the sweep signal Sweep, the shift pulse signal GOA_OUT_N[n] and the first clock signal CK1.

The pulse width modulation circuit 200(n) presets the data signal Data to a first predetermined voltage. Between the timing points t04 and t07, the voltage of the sweep signal Sweep gradually rises, and around the timing point t07, the voltage of the sweep signal Sweep rises to a second predetermined voltage. At this time, a voltage difference between the data signal Data and the sweep signal Sweep (the waveform not shown as the data signal Data in FIG. 3) reaches a predetermined voltage difference (i.e., the difference between the first predetermined voltage and the second predetermined voltage), and the predetermined voltage difference is, for example, the threshold voltage of certain transistors of the pulse width modulation circuit 200(n). Therefore, when the voltage difference between the data signal Data and the sweep signal Sweep reaches the predetermined voltage difference, these transistors are on, allowing the gate high voltage VGH to be transmitted to the output pulse signal PWM_GOA_OUT[n] through the transistors that are on. Accordingly, the output pulse signal PWM_GOA_OUT[n] changes from the gate low voltage VGL to the gate high voltage VGH to form a rising edge. The time difference between the falling edge of the output pulse signal PWM_GOA_OUT[n] at the timing point t04 and the rising edge near the timing point t07 is the output pulse width W2 of the output pulse signal PWM_GOA_OUT[n]. In other words, by adjusting the first predetermined voltage of the data signal Data, the time at which the voltage difference between the data signal Data and the sweep signal Sweep reaches the predetermined voltage difference (i.e., reaching the threshold voltage of certain transistors) may be changed, thereby modulating the output pulse width W2 of the output pulse signal PWM_GOA_OUT[n]. That is, the timing point t07 where the rising edge of the output pulse signal PWM_GOA_OUT[n] occurs may be adjusted, such that the timing point t07 occurs earlier or later, thereby modulating the output pulse width W2.

FIG. 3 is described using the odd stage driving circuits 1000(1), 1000(3), . . . , 1000(2M-1) in FIG. 1 as the example, where the shift control circuit 100(n) and the pulse width modulation circuit 200(n) operate according to the first clock signal CK1. Thus, the falling edges of the output pulse signal PWM_GOA_OUT[n] and the shift pulse signal GOA_OUT_N[n] are substantially aligned to the falling edge of the first clock signal CK1. In another example (not shown in FIG. 3), the even stage driving circuits 1000(2), 1000(4), . . . , 1000(2M) operate according to the second clock signal CK2. Thus, the falling edges of the output pulse signal PWM_GOA_OUT[n] and the shift pulse signal GOA_OUT_N[n] are substantially aligned to the falling edge of the second clock signal CK2. The timing difference of the falling edge of the first clock signal CK1 and the falling edge of the second clock signal CK2 is substantially equal to one half of the period P1 of the first clock signal CK1 (or the period P2 of the second clock signal CK2).

Figure 4:
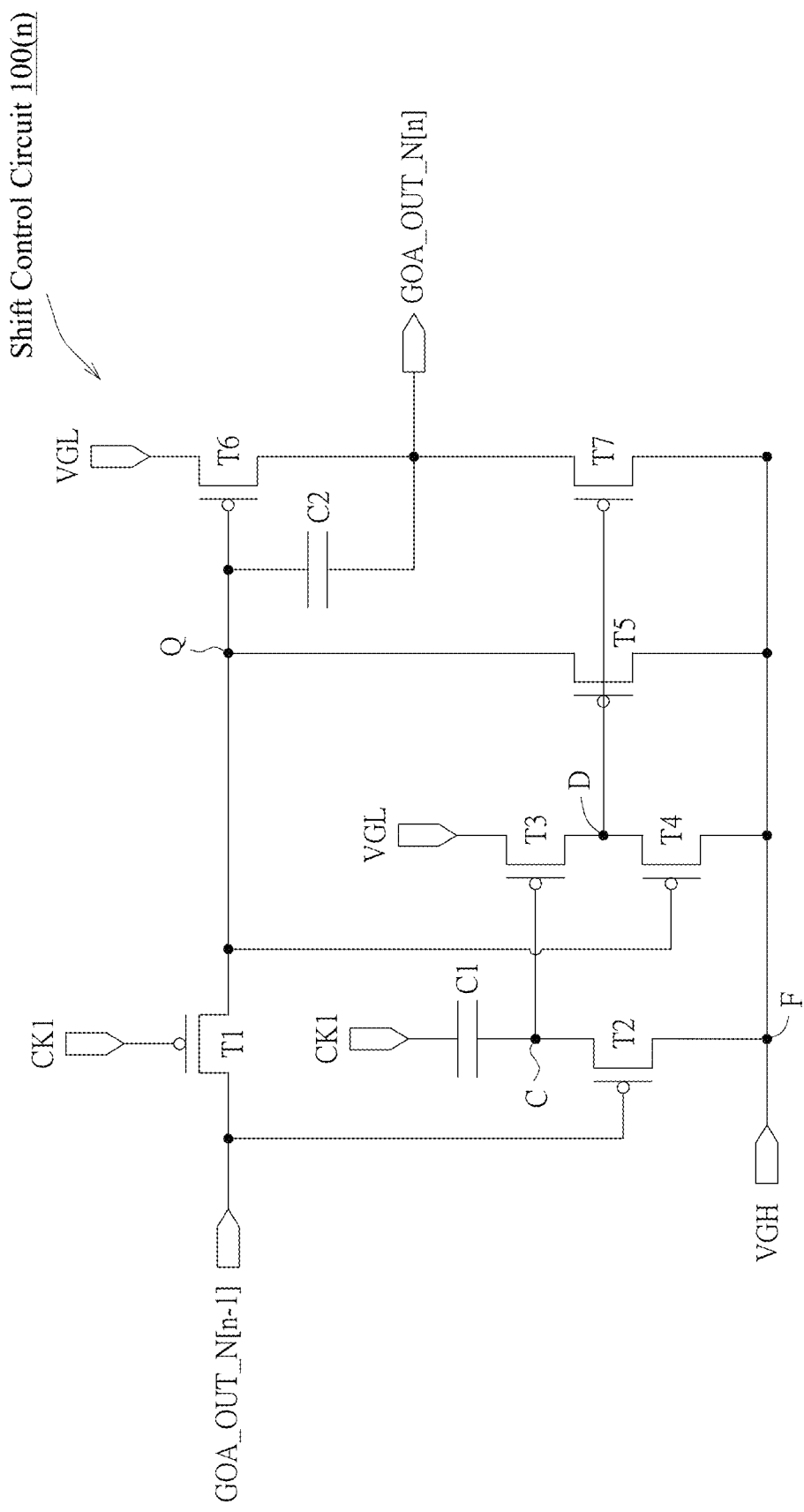
FIG. 4 is a circuitry diagram of the shift control circuit of FIG. 2.

FIG. 4 is a circuitry diagram of the shift control circuit 100(n) of FIG. 2. As shown in FIG. 4, the shift control circuit 100(n) includes seven transistors T1 to T7 and two capacitors C1 and C2. Each of the transistors T1 to T7 has a control end, a first end and a second end. The control end is a gate, the first end is, for example, a drain, and the second end is, for example, a source. In other embodiments, the roles of the first end and the second end may be interchanged, where the first end is the source and the second end is the drain. Each of the capacitors C1 and C2 has a first end and a second end.

The capacitor C1 is mainly used to provide the coupling function, and the capacitor C2 is mainly used to provide the bootstrap or boost function.

The capacitor C1 may be referred to as a "second coupling capacitor." The first end of the capacitor C1 receives the first clock signal CK1, and the second end of the capacitor C1 is coupled to the node C and the first end of the transistor T2. The capacitor C1 has the coupling function, so as to couple the voltage of the first clock signal CK1 to the first end of the transistor T2 through the capacitor C1. The transistor T2 may be referred to as a "second input transistor." The control end of the transistor T2 is coupled to the first end of the transistor T1 and the input end of the shift control circuit 100(n) of the current stage, so as to receive the shift pulse signal GOA_OUT_N[n−1] of the previous stage from the shift control circuit 100(n−1) of the previous stage (FIG. 4 does not show the shift control circuit 100(n−1) of the previous stage). The second end of the transistor T2 is coupled to the node F to receive the gate high voltage VGH.

The transistor T3 may be referred to as a "first control transistor." The first end of the transistor T3 receives the gate low voltage VGL. The control end of the transistor T3 is coupled to the node C to receive the first clock signal CK1 coupled to the capacitor C1. As described, the second end of the transistor T2 is coupled to the node F to receive the gate high voltage VGH. Thus, when the transistor T2 is on, the control end of the transistor T3 may receive the gate high voltage VGH through the transistor T2 which is on. The second end of the transistor T3 is coupled to the node D and the first end of the transistor T4.

The control end of the transistor T4 is coupled to the second end of the transistor T1, so as to receive the shift pulse signal GOA_OUT_N[n−1] of the previous stage through the transistor T1 which is on. The second end of the transistor T4 is coupled to the node F to receive the gate high voltage VGH.

The control ends of the transistor T5 and the transistor T7 are respectively coupled to the node D, the second end of the transistor T3 and the first end of the transistor T4. The second ends of the transistor T5 and the transistor T7 are respectively coupled to the node F to receive the gate high voltage VGH. The first end of the transistor T5 is coupled to the node Q and the second end of the transistor T1, so as to receive the shift pulse signal GOA_OUT_N[n−1] of the previous stage through the transistor T1 which is on. The transistor T7 may be referred to as a "third output transistor." The first end of the transistor T7 is coupled to the output end of the shift control circuit 100(n) of the current stage to control the voltage of the shift pulse signal GOA_OUT_N[n] of the current stage. Further, the first end of the transistor T7 is coupled to the second end of the capacitor C2 and the second end of the transistor T6.

The transistor T6 may be referred to as a "fourth output transistor." The first end of the transistor T6 receives the gate low voltage VGL, the control end of the transistor T6 receives the shift pulse signal GOA_OUT_N[n−1] of the previous stage, and the second end of the transistor T6 is coupled to the output end of the shift control circuit to control the voltage of the shift pulse signal GOA_OUT_N[n].

The capacitor C2 may be referred to a "second bootstrap capacitor." The capacitor C2 is connected across the output end of the shift pulse circuit and the control end of the transistor T6. The first end of the capacitor C2 and the control end of the transistor T6 are both coupled to the node Q and the second end of the transistor T1, so as to receive the shift pulse signal GOA_OUT_N[n−1] of the previous stage through the transistor T1 which is on. Further, the first end of the transistor T6 receives the gate low voltage VGL.

Figure 5:
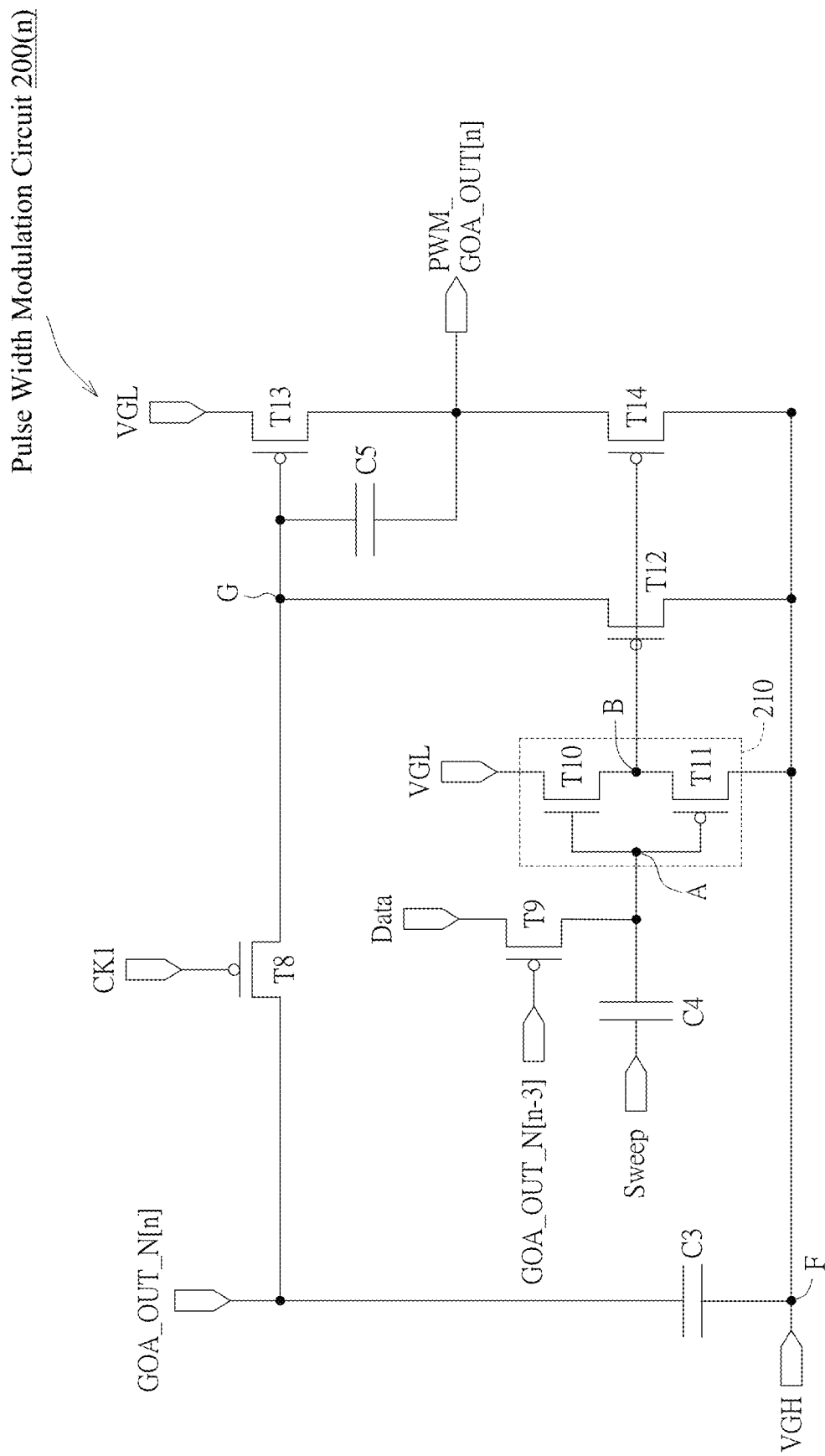
FIG. 5 is a circuitry diagram of the pulse width modulation circuit of FIG. 2.

FIG. 5 is a circuitry diagram of the pulse width modulation circuit 200(n) of FIG. 2. As shown in FIG. 5, the pulse width modulation circuit 200(n) includes seven transistors T8 to T14 and three capacitors C3 to C5. Each of the transistors T8, T9 and T11 to T14 is, for example, a PMOS transistor, and the transistor T10 is an N-type metal-oxide-semiconductor (NMOS) transistor. As described, the transistors T8, T9 and T11 to T14 of the pulse-width modulation circuit 200(n) and the transistors T1 to T7 of the translation control circuit 100(n) as shown in FIG. 4 are all PMOS transistors, which are, for example, low-temperature polycrystalline silicon (LTPS) TFTs. In contrast, the transistor T10 of the pulse-width modulation circuit 200(n) is an NMOS transistor, such as an indium gallium zinc oxide (IGZO) TFT.

Similar to the transistors T1 to T7 of the translation control circuit 100(n), each of the transistors T8 to T14 of the pulse width modulation circuit 200(n) has a control end, a first end and a second end. The control end is a gate, the first end is, for example, a drain (or a source), and the second end is, for example, a source (or a drain). Each of the capacitors C3 to C5 has a first end and a second end. The capacitor C3 is mainly used to provide the stabilizing function, the capacitor C4 is mainly used to provide the coupling function, and the capacitor C5 is mainly used to provide the bootstrap or boost function.

The transistor T10 and the transistor T11 form an inverter circuit 210. The transistor T10 may be referred to as a "first inverter transistor," and the transistor T11 may be referred to as a "second inverter transistor." The control end of the transistor T10 and the control end of the transistor T11 are both coupled to the node A, and the node A functions as the inverted input end of the inverter circuit 210. The second end of the transistor T10 and the first end of the transistor T11 are both coupled to the node B, and the node B functions as the inverted output end of the inverter circuit 210. The first end of the transistor T10 receives the gate low voltage VGL, and the second end of the transistor T11 is coupled to the node F to receive the gate high voltage VGH.

The capacitor C4 may be referred to as a "first coupling capacitor." The first end of the capacitor C4 receives the sweep signal Sweep, and the second end of the capacitor C4 is coupled to the node A. The sweep signal Sweep is coupled to the node A through the capacitor C4, so as to control the operation of the inverter circuit 210 through the inverted input end.

The transistor T9 may be referred to as a "first input transistor." The first end of the transistor T9 receives the data signal Data, the control end of the transistor T9 receives the shift pulse signal GOA_OUT_N[n−3] of the previous third stage, and the second end of the transistor T9 is coupled to the node A. The transistor T9 is on in response to the shift pulse signal GOA_OUT_N[n−3] of the previous third stage, the data signal Data is transmitted to the node A through the transistor T9 which is on, and the sweep signal Sweep is coupled to the node A through the capacitor C4. The voltage of the node A (that is, the inverted input end) is controlled by the data signal Data and the sweep signal Sweep, thereby controlling the operation of the inverter circuit 210. In one example, when the transistor T9 is off, the node A is in a floating state, and the voltage of the node A is substantially equal to the voltage difference of the sweep signal Sweep and the data signal Data. The operation of the inverter circuit 210 is controlled by the voltage difference of the sweep signal Sweep and the data signal Data.

The inverted output end of the inverter circuit 210 is the node B. The node B is coupled to the control ends of the transistor T12 and the transistor T14 respectively. The second ends of the transistor T12 and the transistor T14 are respectively coupled to the node F to receive the gate high voltage VGH. The first end of the transistor T12 is coupled to the node G and the second end of the transistor T8, and the first end of the transistor T8 receives the shift pulse signal GOA_OUT_N[n]. The control end of the transistor T8 receives the first clock signal CK1, and the transistor T8 is on in response to the first clock signal CK1. The first end of the transistor T12 may receive the shift pulse signal GOA_OUT_N[n] through the transistor T8 which is on.

The transistor T14 may be referred to as a "first output transistor." The first end of the transistor T14 is coupled to the output end of the pulse width modulation circuit 200(n) of the current stage to control the voltage of the output pulse signal PWM_GOA_OUT[n] of the current stage. Further, the first end of the transistor T14 is coupled to the second end of the capacitor C5 and the second end of the transistor T13.

The transistor T13 may be referred to as a "second output transistor," and the capacitor C5 may be referred to as a "first bootstrap capacitor." The first end of the capacitor C5 and the control end of the transistor T13 are both coupled to the node G and the second end of the transistor T8, so as to receive the shift pulse signal GOA_OUT_N[n] through the transistor T8 which is on. Further, the first end of the transistor T13 receives the gate low voltage VGL.

The capacitor C3 may be referred to as a "stabilizing capacitor." The first end of the capacitor C3 is coupled to the first end of the transistor T8 and receives the shift pulse signal GOA_OUT_N[n]. The second end of the capacitor C3 is coupled to the node F to receive the gate high voltage VGH.

FIGS. 6A to 6D are schematic views of detailed operations of the shift control circuit 100(n) and the pulse width modulation circuit 200(n). FIG. 7 is a waveform diagram illustrating voltage changes of the signals of the shift control circuit 100(n) and the pulse width modulation circuit 200(n) corresponding to the operations of FIGS. 6A to 6D. Referring first to the waveform diagrams of FIG. 6A and FIG. 7, at the timing point t01, the voltage of the shift pulse signal GOA_OUT_N[n−3] of the previous third stage changes from the gate high voltage VGH to the gate low voltage VGL, the first clock signal CK1 is at the gate high voltage VGH, and the transistor T8 and the transistor T13 are off. In response to the shift pulse signal GOA_OUT_N[n−3] of the gate low voltage VGL, the transistor T9 turns on, and the data signal Data is written into the node A through the transistor T9 which is on. At this time, the voltage VA of the node A is substantially equal to the voltage V(Data) of the data signal Data, and the voltage V(Data) of the data signal Data is, for example, 8.05 V. The node A is coupled to the control end of the transistor T10, and the voltage VA of the node A is applied to the control end of the transistor T10. The transistor T10 is on in response to the voltage VA of the node A (substantially equal to the voltage V(Data) of the data signal Data, e.g., 8.05 V), and the transistor T11 is off. The gate low voltage VGL is written into the node B through the transistor T10 which is on, and the voltage VB of the node B is substantially equal to the gate low voltage VGL.

The node B is coupled to the control ends of the transistor T12 and the transistor T14 respectively. Thus, both the transistor T12 and the transistor T14 are on in response to the voltage VB of the node B (substantially equal to the gate low voltage VGL). At this time, the output end of the pulse width modulation circuit 200(n) receives the gate high voltage VGH through the transistor T14 which is on. Thus, at the timing point t01, the output pulse signal PWM_GOA_OUT [n] output by the pulse width modulation circuit 200(n) is at the gate high voltage VGH.

Since the first clock signal CK1 is at the gate high voltage VGH, the transistor T1 and the transistor T6 in the shift control circuit 100(n) are off. Further, the other transistors in the shift control circuit 100(n) (including the transistors T2, T3, T4, T5 and T7) are also off. At the timing point t01, the shift pulse signal GOA_OUT_N[n] is at the gate high voltage VGH.

Figure 6A:
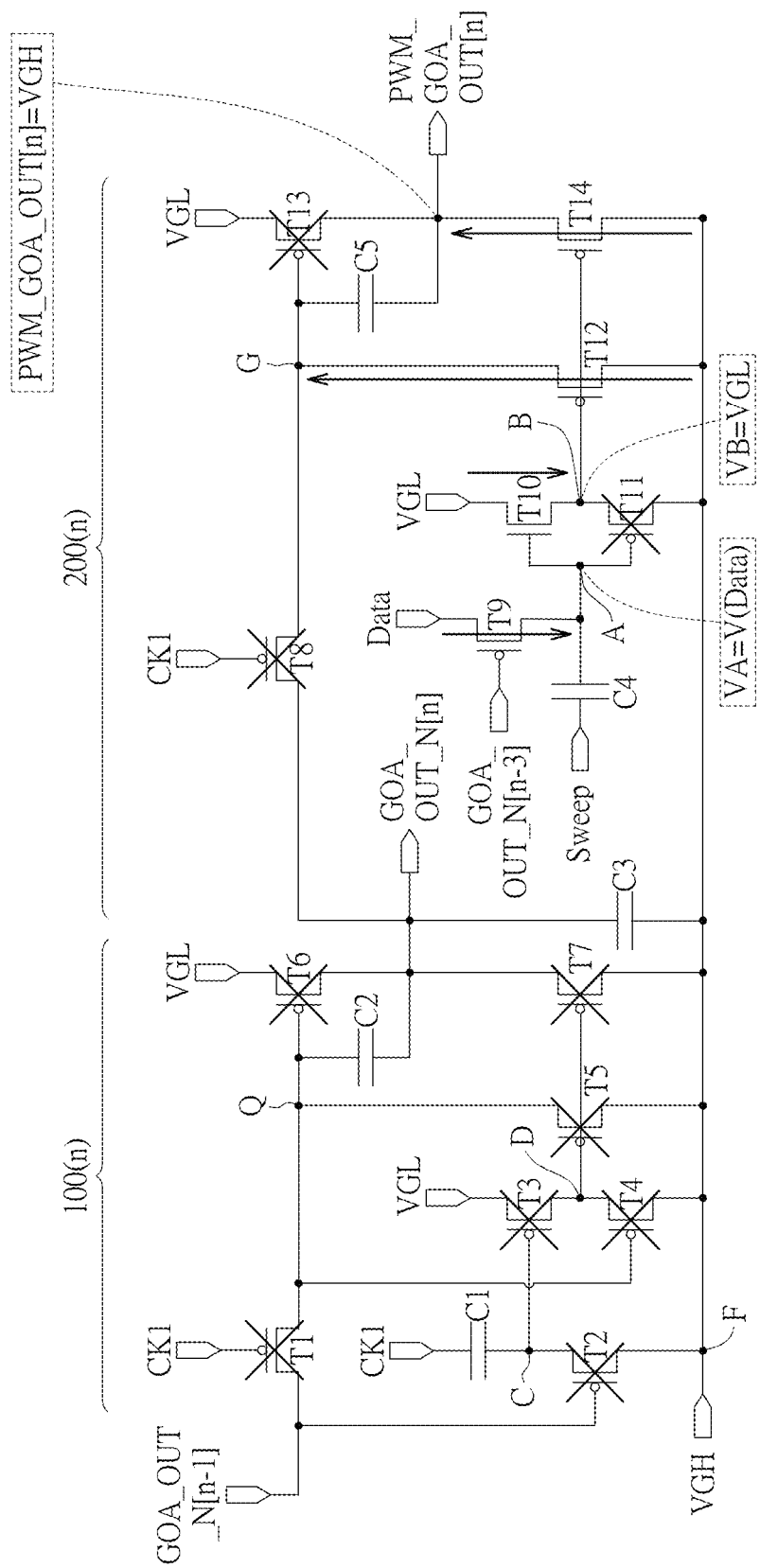
FIGS. 6A to 6D are schematic views of detailed operations of the shift control circuit and the pulse width modulation circuit.
Figure 6B:
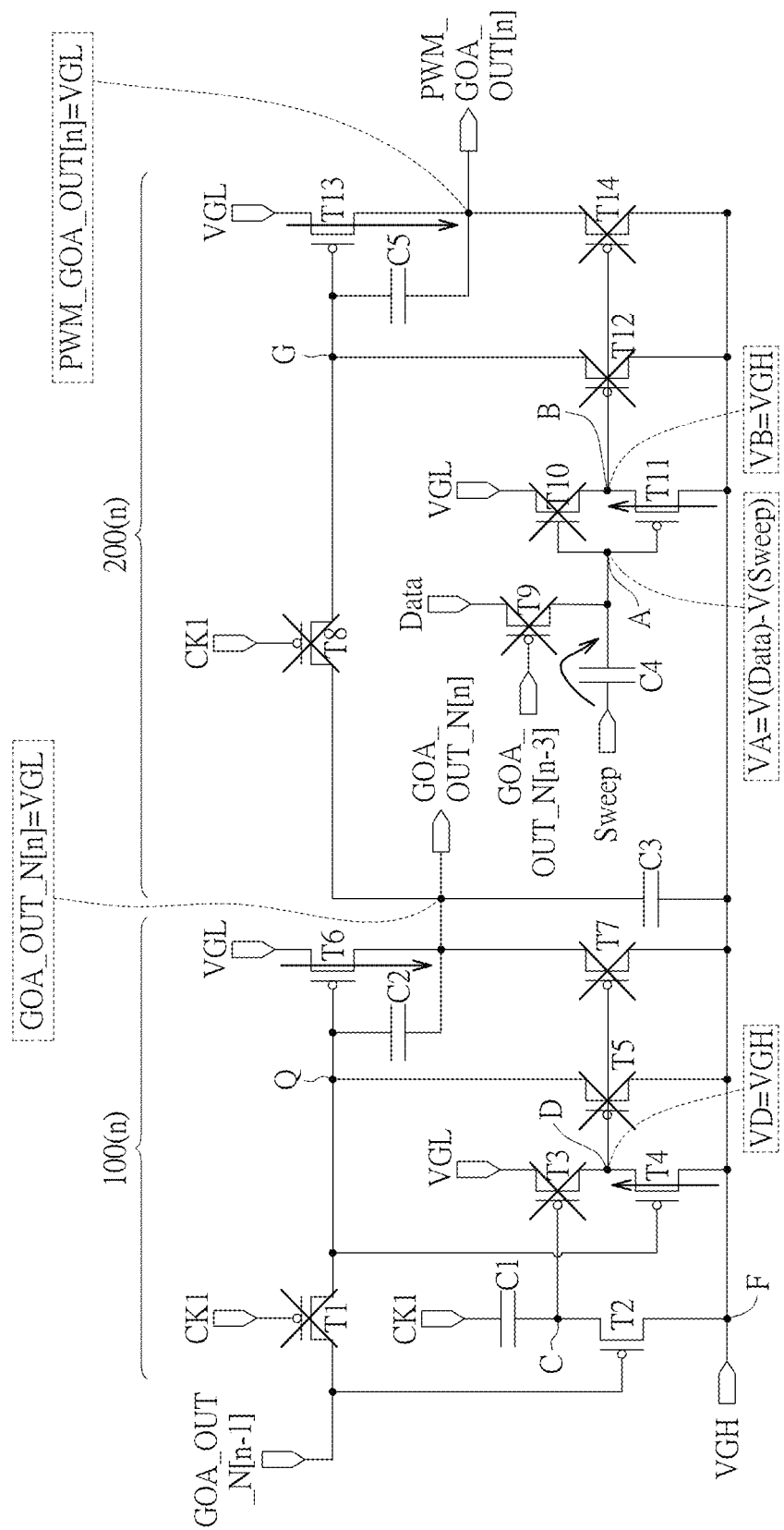
Figure 7:
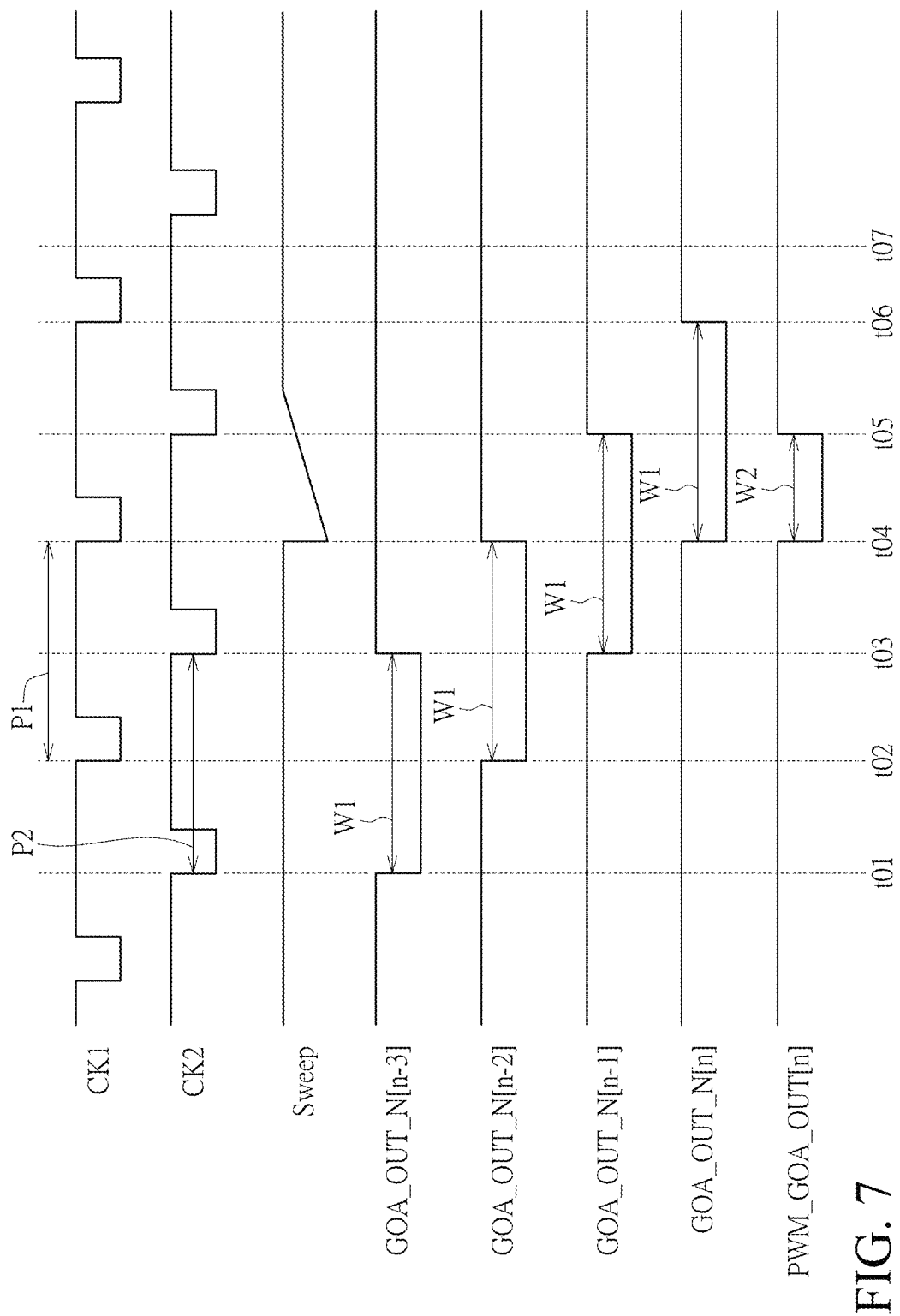
FIG. 7 is a waveform diagram illustrating voltage changes of the signals of the shift control circuit and the pulse width modulation circuit corresponding to the operations of FIGS. 6A to 6D.

Next, referring to the waveform diagrams of FIG. 6B and FIG. 7, at the timing point t04, the first clock signal CK1 is at the gate low voltage VGL, the shift pulse signal GOA_OUT_N[n−1] of the previous stage is also at the gate low voltage VGL, and the shift pulse signal GOA_OUT_N [n−3] of the previous third stage is at the gate high voltage VGH. The transistor T8 is off, and the transistor T13 is on. In response to the shift pulse signal GOA_OUT_N[n−3] of the gate high voltage VGH, the transistor T9 is off, and the node A is in the floating state. The cross-voltage of the capacitor C4 (i.e., the voltage difference between the second end and the first end of the capacitor C4) is coupled to the node A, and the voltage VA of the node A is substantially equal to the voltage difference between the voltage V(Data) of the data signal Data and the voltage V(Sweep) of the sweep signal Sweep, which is shown in formula (1):

$$VA = [V(Data) - V(Sweep)] \qquad (1)$$

At the timing point t04, the voltage V(Sweep) of the sweep signal Sweep changes to the gate low voltage VGL. The voltage VA of the node A is lower than the threshold voltage Vth of the transistor T10, and the transistor T10 is thus off. Further, the transistor T11 is on in response to the voltage VA of the node A. The gate high voltage VGH is written to node B through the transistor T11 which is on, and the voltage VB of the node B is substantially equal to the gate high voltage VGH. Therefore, the transistor T12 and the transistor T14 are off in response to the voltage VB of the node B. At this time, the gate high voltage VGH is no longer transmitted to the output pulse signal PWM_GOA_OUT[n] through the transistor T12 and the transistor T14 which are both off. In contrast, the gate low voltage VGL is transmitted to the output pulse signal PWM_GOA_OUT[n] through the transistor T13 which is on. Thus, the output pulse signal PWM_GOA_OUT[n] changes from the gate high voltage VGH at the previous timing points (e.g., from the timing point t01 to the timing point t03) to the gate low voltage VGL at the timing point t04. In other words, at the timing point t04, in response to the voltage V(Sweep) of the sweep signal Sweep changing to the gate low voltage VGL, the output pulse signal PWM_GOA_OUT[n] also changes to the gate low voltage VGL. When calculating the output pulse width W2 of the output pulse signal PWM_GOA_OUT[n], the timing point t04 is the start timing point. The capacitor C5 has the bootstrap or boost function, which significantly increases the conduction of the transistor T13 (nearing a fully conductive state), such that the output pulse signal PWM_GOA_OUT[n] is rapidly pulled down to the gate low voltage VGL at the start timing point t04 of the output pulse width W2.

Figure 6C:
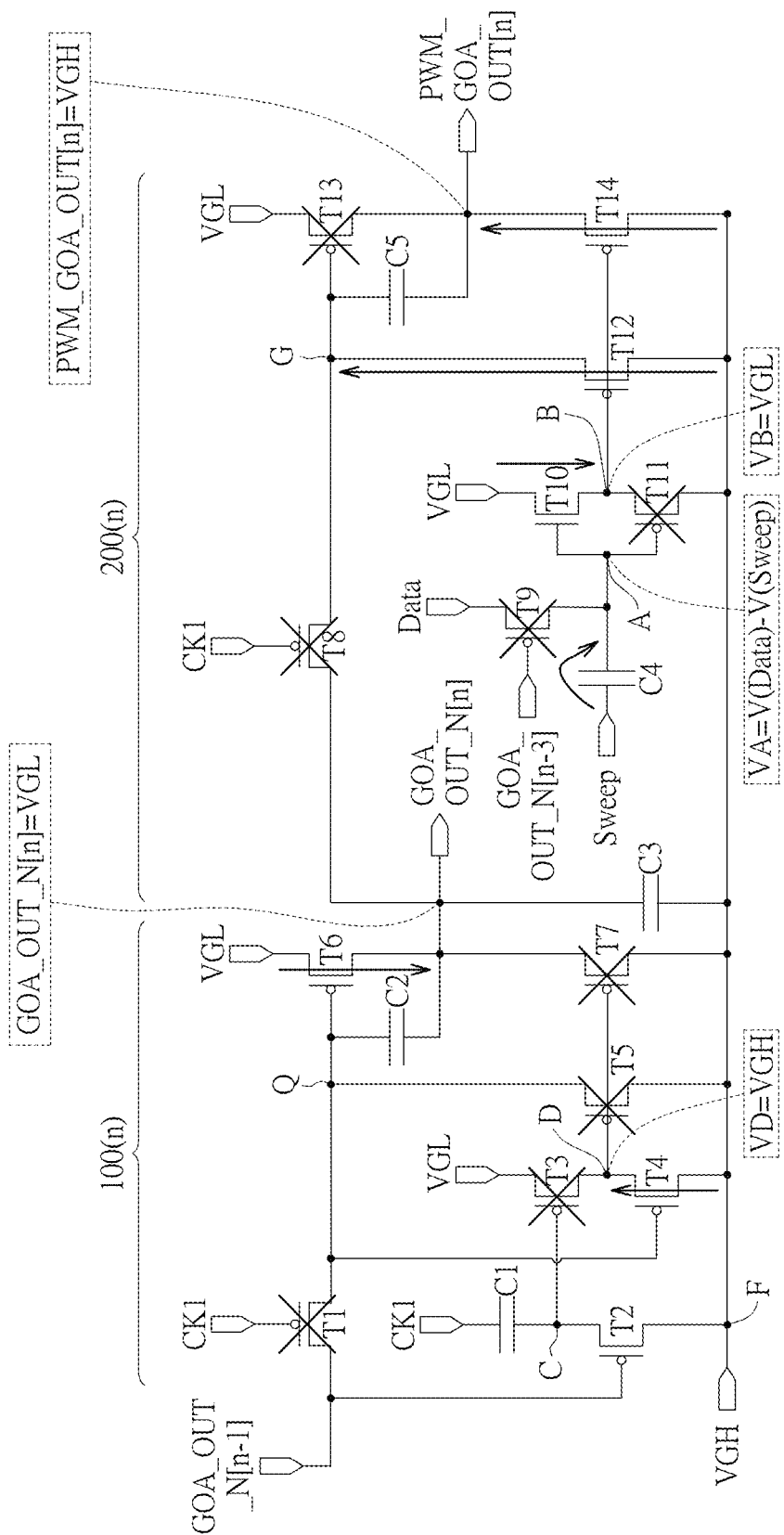

Next, referring to the waveform diagrams of FIG. 6C and FIG. 7, at the timing point t05, the first clock signal CK1 is at the gate high voltage VGH, the transistor T13 is off, the transistor T9 also remains off in response to the gate high voltage VGH of the shift pulse signal GOA_OUT_N[n−3], and the node A is still in the floating state. During the period from the timing point t04 to the timing point t05, the voltage V(Sweep) of the sweep signal Sweep continues to rise. Through the coupling effect of the capacitor C4, the voltage VA of the node A also rises correspondingly. When the voltage VA of the node A rises to be greater than the threshold voltage Vth of the transistor T10, the transistor T10 is on, and the transistor T11 is off. The gate low voltage VGL is written to the node B through the transistor T10 which is on, and the transistor T12 and the transistor T14 are on in response to the voltage VB, which is equal to the gate low voltage VGL. At this time, the gate high voltage VGH is transmitted to the output pulse signal PWM_GOA_OUT[n] through the transistor T12 and the transistor T14 which are both on. Thus, the output pulse signal PWM_GOA_OUT[n] changes from the gate low voltage VGL at the timing point t04 to the gate high voltage VGH at the timing point t05. At the timing point t05, in response to the rise of the voltage V(Sweep) of the sweep signal Sweep, the voltage VA of the node A reaches a predetermined voltage difference. At this time, the voltage VA of the node A is greater than the threshold voltage Vth of the transistor T10, and the output pulse signal PWM_GOA_OUT[n] changes to the gate high voltage VGH at the timing point t05. In calculating the output pulse width W2 of the output pulse signal PWM_GOA_OUT[n], the timing point t05 is the end timing point. That is, the output pulse width W2 is the time difference between the timing point t05 and the timing point t04.

Figure 6D:
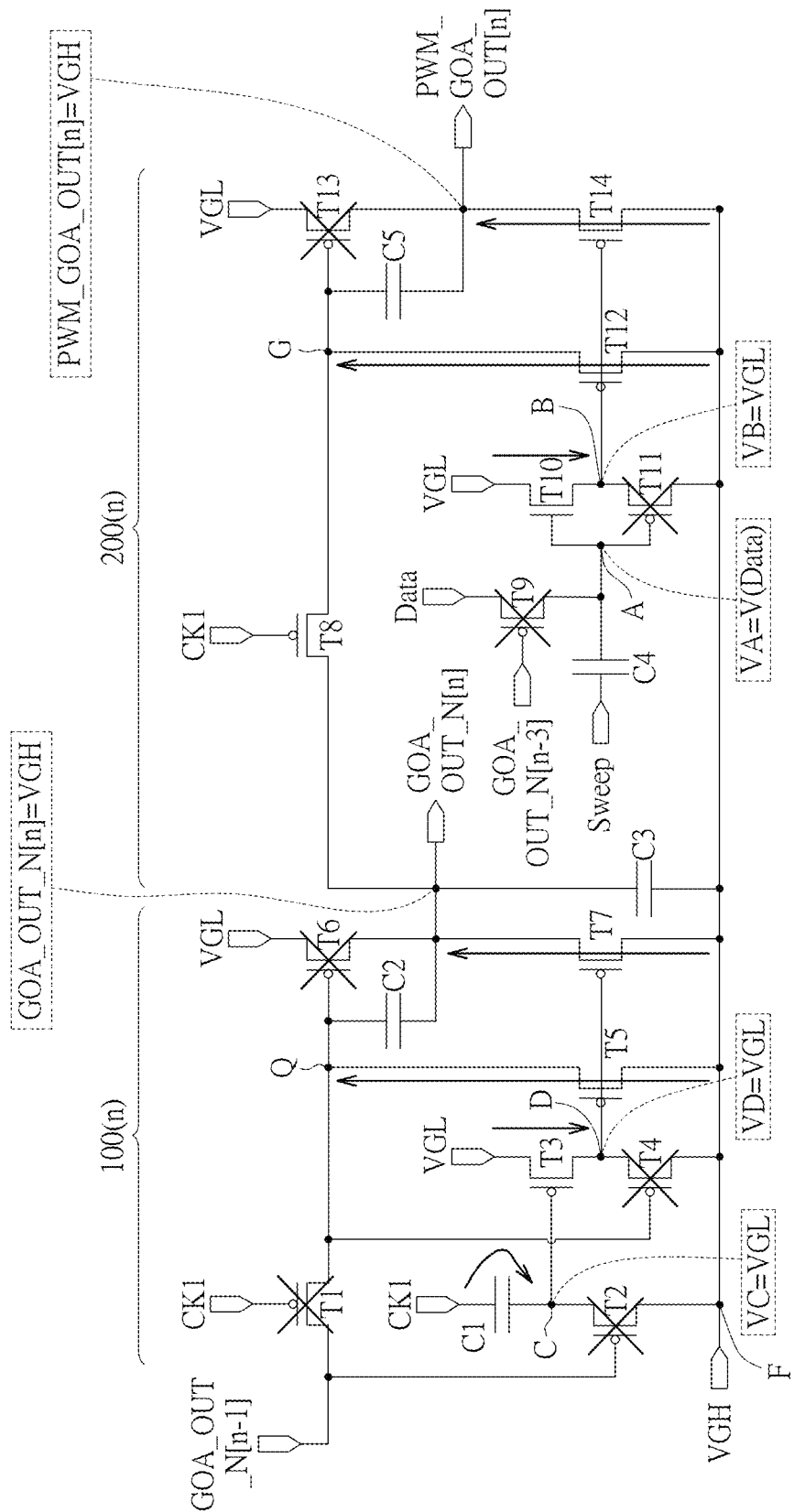

Next, referring to the waveform diagrams of FIG. 6D and FIG. 7, at the timing point t06, the first clock signal CK1 is at the gate low voltage VGL, and in the shift control circuit 100(n), the transistor T1, the transistor T3, the transistor T5 and the transistor T7 are all on, while the transistor T6, the transistor T2 and the transistor T4 are all off. More specifically, the first clock signal CK1, with its voltage equal to the gate low voltage VGL, is coupled to the node C through the capacitor C1, and the voltage VC of the node C is substantially equal to the gate low voltage VGL. In response to the voltage VC of the node C, the transistor T3 is on, and the gate low voltage VGL is transmitted to the node D through the transistor T3 which is on. Thus, the voltage VD of the node D is substantially equal to the gate low voltage VGL. The control ends of the transistor T5 and the transistor T7 are coupled to the node D, and in response to the voltage VD of the node D, the transistor T5 and the transistor T7 are both on. Thus, the gate high voltage VGH is transmitted to the shift pulse signal GOA_OUT_N[n] through the transistor T7 which is on. In other words, at the timing point t06, the shift pulse signal GOA_OUT_N[n] changes to the gate high voltage VGH. As described above, the shift pulse signal GOA_OUT_N[n] changed to the gate low voltage VGL at the previous timing point t04. Thus, the shift pulse width W1 of the shift pulse signal GOA_OUT_N[n] is equal to the time difference between the timing point t04 and the timing point t06. The capacitor C2 provides the bootstrap or boost function, which significantly increases the conduction of the transistor T6 (nearing a fully conductive state), such that the shift pulse signal GOA_OUT_N[n] is rapidly pulled down to the gate low voltage VGL at the start timing point t04 of the shift pulse width W1. Further, the capacitor C3 provides a stabilizing function, such that that the shift pulse signal GOA_OUT_N[n] remains steadily at the gate low voltage VGL throughout the duration of the shift pulse width W1.

On the other hand, in the pulse width modulation circuit 200(n), as the voltage V(Sweep) of the sweep signal Sweep gradually rises, the voltage VA of the node A also gradually increases to reach the voltage V(Data) of the data signal Data.

Figure 8A:
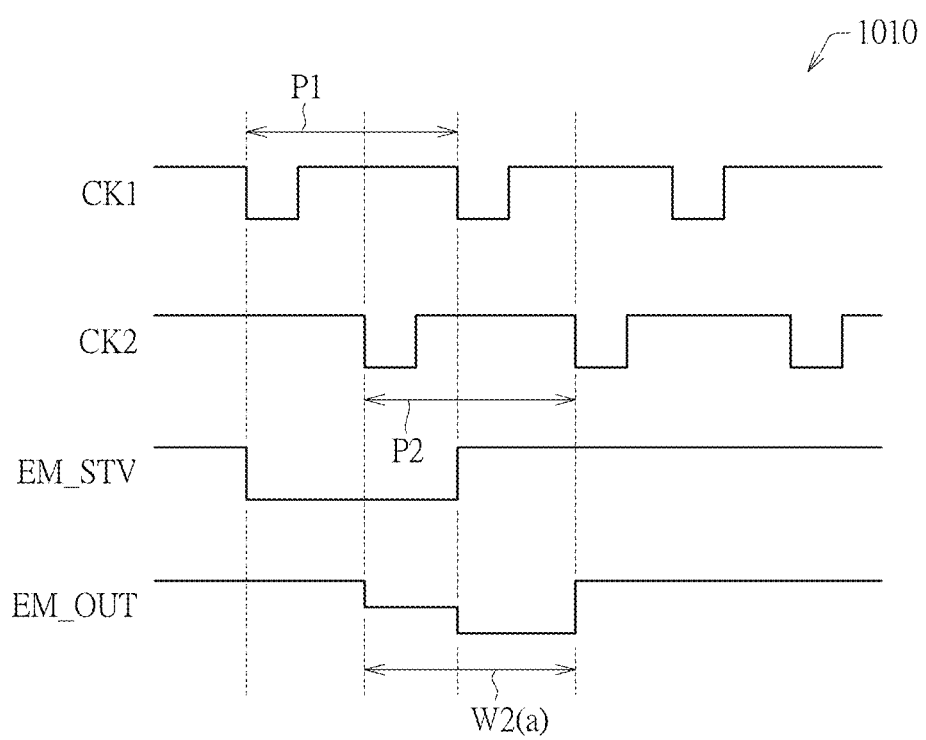
FIG. 8A is a waveform diagram illustrating voltage changes of the signals of a driving circuit according to one comparative embodiment.

FIG. 8A is a waveform diagram illustrating voltage changes of the signals of a driving circuit 1010 according to one comparative embodiment. The driving circuit 1010 as shown in FIG. 8A is an emission type gate-on-array (EM GOA), and the driving circuit 1010 provides the output signal EM_OUT to the pixel array. The function of the output signal EM_OUT is similar to that of the output pulse signal PWM_GOA_OUT[n] of the present disclosure. The width W2(a) of the output signal EM_OUT is fixed and cannot be modulated, and the width W2(a) is fixed as an integer multiple of the period P1 of the first clock signal CK1 or the period P2 of the second clock signal CK2. Further, when the voltage of the output signal EM_OUT decreases, it cannot immediately pull down to the gate low voltage at the falling edge of the second clock signal CK2, but instead decreases stepwise in a staircase-like manner.

Figure 8B:
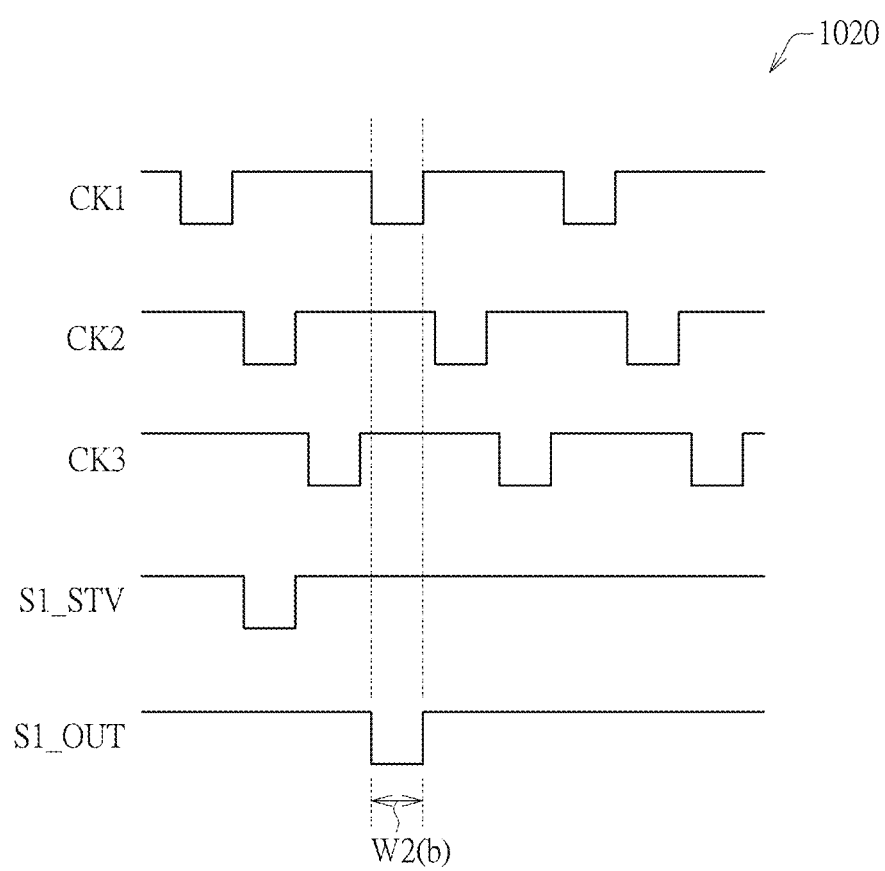
FIG. 8B is a waveform diagram illustrating voltage changes of the signals of a driving circuit according to another comparative embodiment.

On the other hand, FIG. 8B is a waveform diagram illustrating voltage changes of the signals of a driving circuit 1020 according to another comparative embodiment. The driving circuit 1020 as shown in FIG. 8B is a scan type gate-on-array (Scan GOA), and the driving circuit 1020 provides the output signal S1_OUT to the pixel array. The waveform of the output signal S1_OUT must match the waveform of the first clock signal CK1, and thus the width W2(b) of the output signal S1_OUT cannot be changed.

Compared to the comparative embodiments of FIGS. 8A and 8B, the pulse width modulation circuit 200(n) of the present disclosure utilizes the bootstrap effect of the capacitor C5 to significantly increase the conduction of the transistor T13, such that the output pulse signal PWM_GOA_OUT[n] is rapidly pulled down to the gate low voltage VGL. Further, by adjusting the first predetermined voltage of the data signal Data, it is possible to modulate the output pulse width W2 of the output pulse signal PWM_GOA_OUT[n], without being limited to the integer multiples of the period P1 of the first clock signal CK1 or the period P2 of the second clock signal CK2. The output pulse signal PWM_GOA_OUT[n] does not need to match the waveform of the first clock signal CK1.

Figure 9:
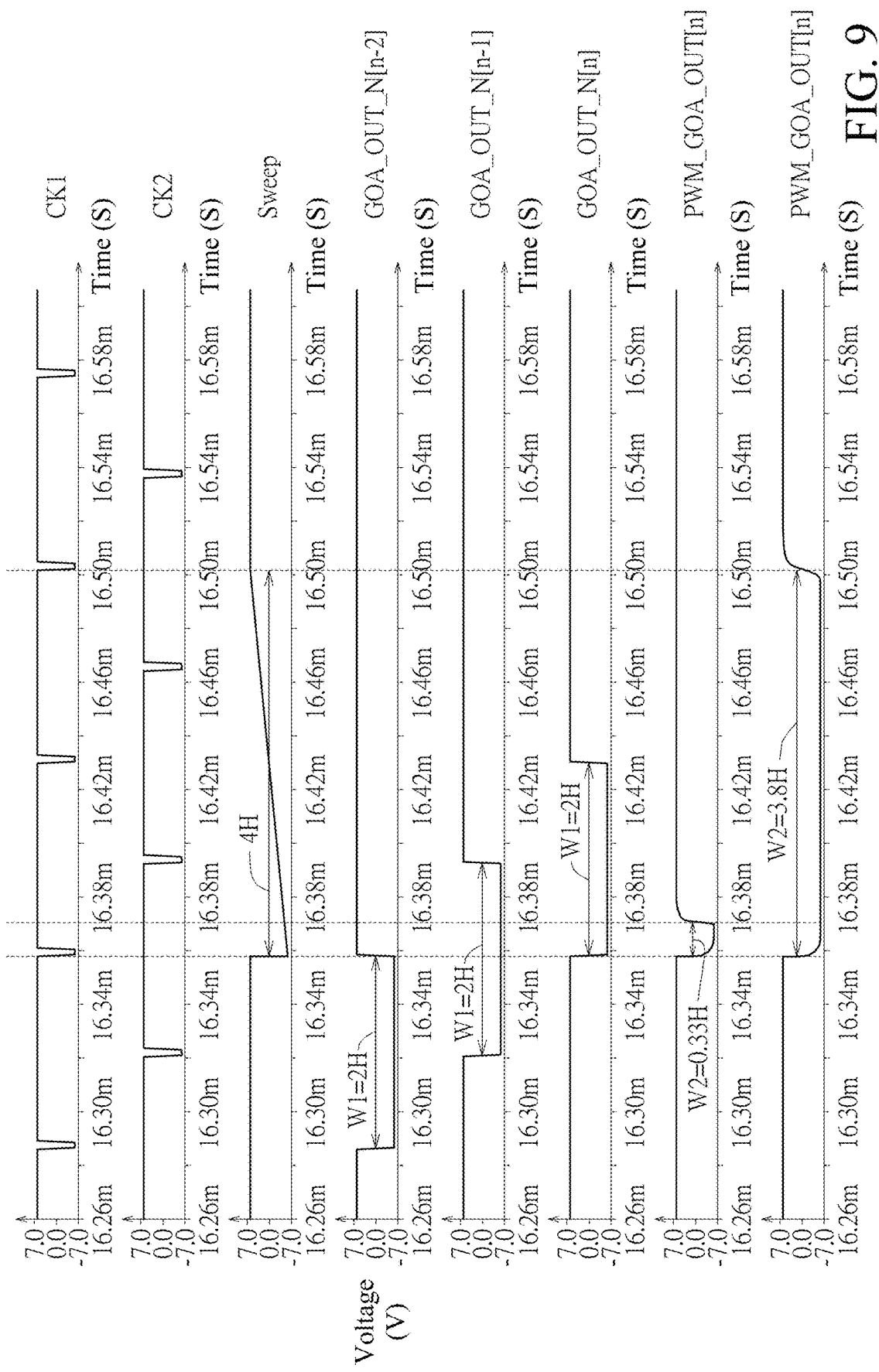
FIG. 9 is a waveform diagram illustrating voltage changes of the signals of the shift control circuit and the pulse width modulation circuit in a simulation result of the driving device of the present disclosure.

FIG. 9 is a waveform diagram illustrating voltage changes of the signals of the shift control circuit 100(n) and the pulse width modulation circuit 200(n) in a simulation result of the driving device 2000 of the present disclosure. The simulation settings are as follows: the period P1 of the first clock signal CK1 and the period P2 of the second clock signal CK2 are both equal to 72 μs. A reference time length H is defined as one half of the period P1, such that both the period P1 and the period P2 are equal to twice the reference time length H (i.e., 2H). The rising duration of the sweep signal Sweep has a time length of 4H. The first predetermined voltage of the data signal Data may be set within the range of 1.8 V to 8.05 V. The pulse width W1 of the shift pulse signal GOA_OUT_N[n−3] of the previous third stage, the shift pulse signal GOA_OUT_N[n−1] of the previous stage and the shift pulse signal GOA_OUT_N[n] of the current stage is equal to 2H.

The output pulse width W2 of the output pulse signal PWM_GOA_OUT[n] may be modulated, and the output pulse width W2 is substantially close to the rising duration of the sweep signal Sweep, which is 4H. For example, if the output pulse width W2 is modulated to 3.8H, the waveform of the output pulse signal PWM_GOA_OUT[n] remains largely undistorted (substantially retaining a square wave shape). In other simulations, the rising duration of the sweep signal Sweep may also be changed to further modulate the output pulse width W2 to increase it beyond 3.8H (e.g., to 5H, 6H, 8H, etc.). On the other hand, the output pulse width W2 may be modulated to decrease to a minimum value of 0.33H, and the waveform still remains largely undistorted.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A driving device, configured to control a plurality of pixels of a pixel array, the driving device comprising a plurality of driving circuits, the driving circuits comprising a current stage driving circuit and a next stage driving circuit, and each of the driving circuits comprising:
    a pulse width modulation circuit, configured to provide an output pulse signal to at least one of the pixels of the pixel array, wherein the output pulse signal has an output pulse width; and
    a shift control circuit, configured to provide a shift pulse signal to the pulse width modulation circuit and the shift control circuit of the next stage driving circuit, wherein the shift pulse signal has a shift pulse width, and the shift pulse width is substantially equal to a first period of a first clock signal or a second period of a second clock signal,
    wherein the first period is equal to the second period, and the pulse width modulation circuit modulates the output pulse width in response to the shift pulse signal, a data signal and a sweep signal;
    wherein the sweep signal changes from a gate high voltage to a gate low voltage according to a falling edge of the first clock signal or a falling edge of the second clock signal, and the pulse width modulation circuit controls the output pulse signal to change from the gate high voltage to the gate low voltage in response to the gate low voltage of the sweep signal to form a falling edge of the output pulse signal;
    wherein the sweep signal increases continuously from the gate low voltage, when a voltage difference between the data signal and the sweep signal reaches a predetermined voltage difference, the pulse width modulation circuit controls the output pulse signal to change from the gate low voltage to the gate high voltage and form a rising edge of the output pulse signal, and a timing difference between the falling edge and the rising edge of the output pulse signal is equal to the output pulse width.

2. The driving device according to claim 1, wherein the predetermined voltage difference is equal to a threshold voltage of at least one transistor of the pulse-width modulation circuit.

3. The driving device according to claim 1, wherein the shift control circuit controls the shift pulse signal to change from the gate high voltage to the gate low voltage to form a falling edge of the shift pulse signal in response to the falling edge of the first clock signal or the falling edge of the second clock signal, and the falling edge of the output pulse signal is essentially aligned to the falling edge of the shift pulse signal.

4. The driving device according to claim 3, wherein the shift pulse signal has a rising edge, the falling edge and the rising edge of the shift pulse signal are substantially aligned to two consecutive falling edges of the first clock signal or the second clock signal respectively, and a timing difference between the falling edge and the rising edge of the shift pulse signal is equal to the shift pulse width.

5. The driving device according to claim 4, wherein the driving circuits comprise:
    a plurality of odd stage driving circuits; and
    a plurality of even stage driving circuits,
    wherein in each of the odd stage driving circuits, the falling edge of the output pulse signal and the falling edge of the shift pulse signal are substantially aligned to the falling edge of the first clock signal, and in each of the even stage driving circuits, the falling edge of the output pulse signal and the falling edge of the shift pulse signal are substantially aligned to the falling edge of the second clock signal.

6. A driving device, configured to control a plurality of pixels of a pixel array, the driving device comprising a plurality of driving circuits, the driving circuits comprising a current stage driving circuit, a previous stage driving circuit, a previous third stage driving circuit and a next stage driving circuit, and each of the driving circuits comprising:
    a pulse width modulation circuit, configured to provide an output pulse signal to at least one of the pixels of the pixel array, wherein the output pulse signal has an output pulse width; and
    a shift control circuit, configured to provide a shift pulse signal to the pulse width modulation circuit and the shift control circuit of the next stage driving circuit, wherein the shift pulse signal has a shift pulse width, and the shift pulse width is substantially equal to a first period of a first clock signal or a second period of a second clock signal,
    wherein the first period is equal to the second period, and the pulse width modulation circuit modulates the output pulse width in response to the shift pulse signal, a data signal and a sweep signal;
    wherein the shift control circuit of the current stage driving circuit receives the shift pulse signal of a previous stage from the shift control circuit of the previous stage driving circuit, and the shift control circuit of the previous third stage driving circuit provides the shift pulse signal of a previous third stage to the pulse width modulation circuit of the current stage driving circuit;
    wherein a timing difference between the falling edge of the shift pulse signal of the previous stage and the falling edge of the shift pulse signal of the current stage is equal to one half of the first period or one half of the second period.

7. A driving device, configured to control a plurality of pixels of a pixel array, the driving device comprising a plurality of driving circuits, the driving circuits comprising a current stage driving circuit and a next stage driving circuit, and each of the driving circuits comprising:

a pulse width modulation circuit, configured to provide an output pulse signal to at least one of the pixels of the pixel array, wherein the output pulse signal has an output pulse width; and a shift control circuit, configured to provide a shift pulse signal to the pulse width modulation circuit and the shift control circuit of the next stage driving circuit, wherein the shift pulse signal has a shift pulse width, and the shift pulse width is substantially equal to a first period of a first clock signal or a second period of a second clock signal, wherein the first period is equal to the second period, and the pulse width modulation circuit modulates the output pulse width in response to the shift pulse signal, a data signal and a sweep signal;

wherein the pulse width modulation circuit comprises:
a first coupling capacitor, receiving the sweep signal;
an inverter circuit, having an inverted input end and an inverted output end, wherein the inverted input end is coupled to the first coupling capacitor, and the sweep signal is coupled to the inverted input end through the first coupling capacitor; and
a first input transistor, having a first end to receive the data signal, a control end to receive the shift pulse signal of a previous third stage, and a second end coupled to the inverted input end of the inverter circuit, wherein the shift pulse signal of the previous third stage is provided by the shift control circuit of a previous third stage driving circuit.

8. The driving device according to claim 7, wherein the first input transistor is on or off in response to the shift pulse signal of the previous third stage, and when the first input transistor is on, the data signal is transmitted to the inverted input end of the inverter circuit through the first input transistor, and a voltage of the inverted input end is equal to a voltage of the data signal.

9. The driving device according to claim 8, wherein when the first input transistor is off, the inverted input end of the inverter is in a floating state, and the voltage of the inverted input end is equal to a voltage difference between the voltage of the data signal and a voltage of the sweep signal.

10. The driving device according to claim 7, wherein the inverter circuit comprises:
a first inverter transistor, being an indium gallium zinc oxide thin-film transistor; and
a second inverter transistor, being a low temperature polycrystalline silicon thin-film transistor,
wherein a control end of the first inverter transistor and a control end of the second inverter transistor are both coupled to the inverted input end, and the first inverter transistor is on in response to a voltage difference between a voltage of the data signal and a voltage of the sweep signal.

11. The driving device according to claim 10, wherein the pulse width modulation circuit further comprises:
a stabilizing capacitor, connected across an input end of the pulse width modulation circuit and a second end of the second inverter transistor,
wherein the input end of the pulse width modulation circuit receives the shift pulse signal, and the second end of the second inverter transistor receives a gate high voltage.

12. The driving device according to claim 10, wherein the pulse width modulation circuit further comprises:
a first output transistor, having a first end coupled to an output end of the pulse width modulation circuit to control a voltage of the output pulse signal, a control end coupled to the inverted output end of the inverter circuit, and a second end to receive a gate high voltage,
wherein when the first inverter transistor is on, the control end of the first output transistor receives a gate low voltage through the first inverter transistor and is on, and the gate high voltage is transmitted to the output pulse signal through the first output transistor.

13. The driving device according to claim 12, wherein the pulse width modulation circuit further comprises:
a second output transistor, having a first end to receive the gate low voltage, a control end to receive the shift pulse signal, and a second end coupled to the output end of the pulse width modulation circuit; and
a first bootstrap capacitor, connected across the output end of the pulse width modulation circuit and the control end of the second output transistor.

14. A driving device, configured to control a plurality of pixels of a pixel array, the driving device comprising a plurality of driving circuits, the driving circuits comprising a current stage driving circuit and a next stage driving circuit, and each of the driving circuits comprising:
a pulse width modulation circuit, configured to provide an output pulse signal to at least one of the pixels of the pixel array, wherein the output pulse signal has an output pulse width; and
a shift control circuit, configured to provide a shift pulse signal to the pulse width modulation circuit and the shift control circuit of the next stage driving circuit, wherein the shift pulse signal has a shift pulse width, and the shift pulse width is substantially equal to a first period of a first clock signal or a second period of a second clock signal, wherein the first period is equal to the second period, and the pulse width modulation circuit modulates the output pulse width in response to the shift pulse signal, a data signal and a sweep signal;

wherein the shift control circuit comprises:
a second coupling capacitor, receiving the first clock signal; and
a second input transistor, having a first end coupled to the second coupling capacitor, a control end coupled to an input end of the shift control circuit to receive the shift pulse signal of a previous stage, and a second end to receive a gate high voltage.

15. The driving device according to claim 14, wherein the shift control circuit further comprises:
a first control transistor, having a first end to receive a gate low voltage, and a control end coupled to the first end of the second input transistor and the second coupling capacitor; and
a third input transistor, having a first end coupled to an output end of the shift control circuit to control a voltage of the shift pulse signal, a control end coupled to a second end of the first control transistor, and a second end to receive the gate high voltage,
wherein when the first control transistor is on, the control end of the third input transistor receives the gate low voltage through the first control transistor and is on, and the gate high voltage is transmitted to the shift pulse signal through the third output transistor.

16. The driving device according to claim 15, wherein the shift control circuit further comprises:
a fourth output transistor, having a first end to receive the gate low voltage, a control end to receive the shift pulse signal of the previous stage, and a second end coupled to the output end of the shift control circuit; and a second boost capacitor, connected across the output end of the shift pulse circuit and the control end of the fourth output transistor.

\* \* \* \* \*